United States Patent Office 3,041,362
Patented June 26, 1962

1

3,041,362
CYCLIC SILETHYLENESILOXANES AND
POLYMERS THEREOF
Robert L. Merker, Pittsburgh, Pa., assignor to Dow Corning Corporation, Midland, Mich., a corporation of Michigan
No Drawing. Filed Aug. 14, 1959, Ser. No. 833,693
14 Claims. (Cl. 260—448.2)

The present invention relates to cyclic silethylenesiloxanes and certain polymers thereof. This application is a continuation-in-part of my copending application Serial No. 647,184, filed March 20, 1957, now abandoned.

Cyclic organosiloxanes of the formula $(R_2SiO)_x$ where $x$ is 3 or more and R is a monovalent hydrocarbon radical (particularly methyl and/or phenyl) are well known. Such cyclics can be polymerized to high molecular weight linear polymers which are useful, e.g., as viscous fluids per se in hydraulic or damping devices, in lubricants, and as polymers for the production of silicone rubber. The polymerization of such material is ordinarily carried out with the use of either acid or alkaline catalysts. In spite of the presence of such catalysts, however, several hours at elevated temperatures (e.g. 150° to 180° C.) are needed to reach equilibrium conditions and the desired degree of polymerization. A few very strong catalysts are capable of bringing about polymerization at ordinary room temperature, but many hours are then required to produce the desired results.

Two further problems have been encountered in the use of the above conventional cyclic organosiloxanes. First, the removal of the last traces of strong catalysts is often essential for optimum physical properties in the final product, and such removal is exceedingly difficult in the case of high polymers. Second, it has been found that many of the organosiloxanes are subject to a minute amount of organic group cleavage in the conventional processes. Although this cleavage is rather insignificant on a mathematical basis, it leads to cross-linkage in the polymer which in turn can have an extremely detrimental effect on the properties of rubber prepared therefrom.

It is an object of the present invention to provide an organosilicon material which can be polymerized to a high molecular weight at low temperatures and/or in a minimum amount of time. A further object is the provision of a readily polymerizable monomer with which a relatively weak catalyst can be used so that under many circumstances no catalyst removal is necessary, or so that achieving the necessary degree of removal is greatly expedited. Another object is to provide an organosilicon material which can be polymerized under such mild conditions that no objectionable organic group cleavage will occur. A further object is to provide novel polymers which are free of the effects of the aforesaid group cleavage and which have novel properties.

The above objectives have been attained in the compounds of this invention. The cyclics of this invention are of the formula

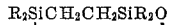
$R_2SiCH_2CH_2SiR_2O$ where R is a radical selected from the group consisting of phenyl, cyclohexyl, and alkyl radicals, at least three of said R radicals being of from 1 to 6 inclusive carbon atoms. Preferably the R radicals are methyl and/or phenyl radicals. It is to be understood that each R radical can be the same as or different from its fellows, with the exception that only one R group per molecule can contain seven or more carbon atoms.

The polymers of this invention fall into three distinct but related classes, i.e.:

(I) Homopolymers consisting essentially of polymeric units (A) of the formula $[—Si(R)_2CH_2CH_2(R)_2SiO—]$ where R is a radical selected from the group consisting of phenyl, cyclohexyl, and alkyl radicals, at least 3 of said R radicals being of from 1 to 6 inclusive carbon atoms and at least one R in each unit being phenyl;

(II) Copolymers consisting essentially of polymeric units (A) as above defined, and polymeric units (B) of the formula

$R'_xSiO_{\frac{4-x}{2}}$ where R' is selected from the group consisting of monovalent hydrocarbon radicals and halogenated monovalent hydrocarbon radicals, and $x$ is an integer from 0 to 3 inclusive and has an average value in the copolymer of at least 0.8; and (III) Copolymers consisting essentially of polymeric units (A) as above defined wherein only one R radical per unit is phenyl, and polymeric units (A) as above defined wherein at least two R radicals per unit are phenyl.

The highly strained nature of the above defined cyclic compounds is evidenced by the ease with which the siloxane bond can be ruptured and polymerization initiated. This strained ring system is perhaps more easily seen in representing the compounds by their cyclic structural formula:

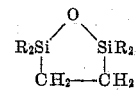

These cyclic silethylenesiloxanes can be prepared by hydrolyzing the corresponding 1,2-di-(diorganochlorosilyl)ethane and then subjecting the hydrolyzate to thermal cracking in the presence of an alkali metal hydroxide.

The disilylethane compound is best prepared by the reaction of the corresponding $R_2HSiCl$ with

$(CH_2=CH)R_2SiCl$ in the presence of chloroplatinic acid as the catalyst. The reaction is an addition reaction, and the product has the formula $ClR_2SiCH_2CH_2SiR_2Cl$. Reaction temperatures in the range of 100° to 175° C. are preferred. The catalyst is ordinarily used in concentrations of from $1 \times 10^{-3}$ to $1 \times 10^{-7}$ mol per mol of the vinylsilane. The commercial form of the catalyst is as the hexahydrate, $H_2PtCl_6 \cdot 6H_2O$, and this form is completely satisfactory. Since relatively minute amounts are used, it is best to employ a solution of the catalyst, e.g. in isopropanol or the dimethyl ether of diethylene glycol.

It can be seen that any desired combination of R radicals in the defined disilylethane is readily obtained by choosing the appropriate hydrogenosilane and vinylsilane reactants. Illustrative of the former are the compounds $Me_2HSiCl$, $MeEtHSiCl$, $C_{18}H_{37}MeHSiCl$, $Bu_2HSiCl$, $Ph_2HSiCl$, $PhMeHSiCl$, $C_6H_{11}MeHSiCl$, and $(C_6H_{11})_2HSiCl$. Illustrative of the latter are $ViMe_2SiCl$, $ViPh_2SiCl$, $ViPhMeSiCl$, $ViBu_2SiCl$, $Vi(C_6H_{11})_2SiCl$, $ViMeC_{12}H_{25}SiCl$, and $Vi(C_6H_{11})MeSiCl$. The symbols Me, Et, Bu, Ph, $C_6H_{11}$, and Vi are used above and throughout this specification to represent methyl, ethyl, butyl, phenyl, cyclohexyl, and vinyl radicals respectively. These silanes are well-known materials, many of which are commercially available. All of them can be produced, for example, by the reaction of the corresponding Grignard reagent or reagents in the well-known manner with either $HSiCl_3$ or $RHSiCl_2$ compounds in the former instance or with $SiCl_4$ or $ViSiCl_3$ in the latter instance.

It will be noted that only chlorosilane reactants have been described above. These are preferred because of their commercial availability. Obviously, however, the corresponding bromosilanes or alkoxysilanes can be used to produce adducts which are easily hydrolyzed to form the necessary siloxane intermediate, which is then "cracked" in the same manner as previously described.

The disilylethane adducts can be hydrolyzed by any of the usual silane hydrolysis techniques. Ordinarily an excess above the theoretical amount of water is used, and for handling ease it is usually preferable to conduct the hydrolysis in the presence of an inert solvent such as toluene, xylene, petroleum hydrocarbons, and the like. Acid or alkaline catalysts can be used if desired to aid in complete hydrolysis. The hydrolyzate should be neutralized or washed free of substantially all of any acid catalyst or by-product residual acid which may be present prior to the "cracking" operation.

It is preferred that the hydrolyzate then be stripped of any solvent which may be present, and NaOH, KOH, or LiOH added, preferably in powdered form. When any of the heavier organic groups (e.g. 6 or more carbon atoms) are present in the product, LiOH seems to be the most effective. These catalysts are best used in amounts of from about 0.1 to 1 percent by weight based on the weight of the hydrolyzate, although larger amounts do no particular harm. The catalyst-hydrolyzate mixture is then heated, and the evolved cyclics removed by distillation.

The temperature required for this "cracking" operation is ordinarily in the region of 200° to 300° C., but will vary with the type and amount of alkali metal hydroxide present and with the type of R radicals in the molecule. Atmospheric pressure can be used when the product is one of the lower boiling cyclics, i.e. when all or most of the R radicals are of low molecular weight such as methyl and/or ethyl radicals. When the product is of relatively high molecular weight it is preferred to operate under reduced pressure.

The most preferred of the cyclic compounds of this invention are those in which the R radicals are alkyl radicals of from 1 to 4 inclusive carbon atoms and/or phenyl radicals. When one R group is an alkyl radical of seven or more carbon atoms (e.g. dodecyl and octadecyl) the remaining three R groups should be of from 1 to 6 carbon atoms, and in such a case it is most preferred that all of the latter three groups be methyl.

The extraordinary ease with which the siloxane bonds in these cyclic compounds can be ruptured is illustrated by their reaction with water. At room temperature and in the absence of any apparent catalyst, these cyclics react with water to form disilanols of the formula $HOSi(R)_2CH_2CH_2(R)_2SiOH$ and higher linear polymers (siloxanols) of the formula $$HO[Si(R)_2CH_2CH_2(R)_2SiO]_nH$$

where $n$ is greater than 1. At higher temperatures more of the latter polymers are produced. Either of these types of silanols can be co-condensed with other conventional organosiloxanes containing uncondensed silanol groups to form the corresponding copolymers of this invention. Thus there is provided an easy method for the incorporation of desired types of R groups into organosiloxane fluids, resins, or rubbers. The silanols are also reactive toward any of the functional organic compounds known to be reactive with silanol groups, and hence provide a low molecular weight, easily purified intermediate for such reactions.

An almost negligible amount of the usual well known acid or alkaline siloxane polymerization catalysts will initiate polymerization of the cyclics of this invention, even at room temperature. The rate of polymerization is of course speeded up at higher temperatures, so long as such temperatures are maintained below that at which decomposition, depolymerization, or "cracking" occurs. Thus a polymerization temperature below 200° C. is generally preferred. Alkaline catalysts such as NaOH, KOH, LiOH, and $(CH_3)_4NOH$; and acid catalysts such as sulfuric acid or trifluoroacetic acid are very suitable, and are beneficially used in amounts of 0.001 to 0.1 percent by weight based on the weight of the siloxanes. Amounts of catalysts up to 2 percent or more can of course be employed, but ordinarily this is neither necessary nor advantageous. If it is desired to avoid the presence of silicon bonded hydroxyl groups in the polymer, the polymerization should be carried out under conditions as nearly anhydrous as possible. Alkali metal silanolates, such as $Me_3SiOM$ and $MO(Me_2SiO)_zM$ where M is Na, K, or Li and $z$ is at least 1, are also well known siloxane polymerization catalysts and are eminently suitable here. Preferably $z$ is from 1 to about 10, but can be any larger number if correspondingly more of the salt is used.

In all of the polymers of this invention, whether they be homopolymers or copolymers, it is preferred that at least one R radical in each $$[—Si(R)_2CH_2CH_2(R)_2SiO—]$$

unit be a phenyl radical. This preference is set forth, even though all of the defined cyclics can be polymerized or copolymerized to form liquids, gums, or resins which are useful in the usual manner of the conventional organosiloxanes, because the thermal stability of said polymers is greatly enhanced by the presence of such phenyl groups. Furthermore, it is the incorporation of phenyl groups into conventional organosiloxanes by means of the highly reactive cyclics which constitutes one of the major advantages of this invention.

The homopolymers of this invention can be prepared by contacting any single species of the above defined cyclic compounds of the formula

where at least one R is phenyl, with any of the aforesaid siloxane polymerization catalysts. The cyclic should be in a liquid phase for this polymerization, and bulk, solution, or emulsion polymerization techniques are applicable. The homopolymers range from liquids through gums to high melting or softening point thermoplastic solids of resinous characteristics. The physical state varies in the indicated direction both as a function of increasing phenyl content and of increasing molecular weight or degree of polymerization. Thus the homopolymers are useful as damping media, sources of silicone rubber, potting compounds, and moulding or casting resins, all as based upon the same criteria as involved in the use of the related well known conventional organosiloxanes. The great ease with which the original siloxane bonds in the cyclic silethylenesiloxanes are ruptured is lost after the initial rupture has occurred, hence the polymers are stable materials.

The preferred homopolymers are those in which all of the R radicals are phenyl or methyl, with the condition that at least one R per polymeric unit be phenyl. Thus the preferred homopolymers can be defined as consisting essentially of units of the formula $$[—Si(Ph)_c(Me)_{2-c}CH_2CH_2(Ph)_d(Me)_{2-d}SiO—]$$

where $c$ is an integer of from 1 to 2 inclusive and $d$ is an integer of from 0 to 2 inclusive.

It is to be understood that the above unit formulas have defined the same unit as that which exists when the oxygen atom is shown at the opposite end of the formula, i.e., as in the formula $$[—OSi(R)_2CH_2CH_2(R)_2Si—]$$

As is conventional in depicting organosiloxane polymers, the oxygen and silicon atoms at either end of the unit formula are understood to be linked to other silicon or oxygen atoms respectively in siloxane linkages, although any particular molecule can of course be endblocked with silicon-bonded OH groups as has been shown above.

The homopolymers can exist in both linear form and in the form of cyclics containing any plurality of the defined units.

The copolymers of this invention are of two related classes. In one class, the copolymer consists essentially of units of the defined formula

[—Si(R)₂CH₂CH₂(R)₂SiO—]

where only one R radical is phenyl and units of the same formula where at least two R radicals per unit are phenyl. In other words, in terms of the preferred units discussed previously, this type of copolymer contains units (C) of the formula [—SiPhMeCH₂CH₂Me₂SiO—] copolymerized with any one or more of the following (D) units: [—SiPhCH₂CH₂Me₂SiO—]

[—SiPhMeCH₂CH₂PhMeSiO—]

[—SiPh₂CH₂CH₂PhMeSiO—]

and

[—SiPh₂CH₂CH₂Ph₂SiO—]

Any ratio whatsoever of the (C) and (D) units can be present in the copolymer, but it is preferred that the copolymer be one in which from 35 to 85 percent of the total R radicals are phenyl.

The above type of copolymer can be prepared in the same manner as discussed above in regard to the homopolymers, except for the obvious fact that there must be two or more of the appropriate species of cyclics present. These copolymers are the same in their possible physical states and usages as the homopolymers, and can exist in both linear and larger cyclic forms.

The second type of copolymer within the scope of this invention is that which contains any one or more of the [—Si(R)₂CH₂CH₂(R)₂SiO—] type units (A) copolymerized with the "conventional" organosiloxane units (B) of the formula $$R'_xSiO_{\frac{4-x}{2}}$$

where R' represents monovalent hydrocarbon radicals or halogenated derivatives thereof and $x$ is an integer from 0 to 3 inclusive. These copolymers can be prepared by condensation reactions between the previously described silanols or siloxanols and those "conventional" organosiloxanes which contain substantial amounts of uncondensed silicon-bonded OH groups. Preferably, however, the copolymers are prepared by copolymerization techniques employing the usual catalysts and techniques as previously described, and using the defined cyclics of this invention and conventional organosiloxanes as the reactants.

Any of the $$R'_xSiO_{\frac{4-x}{2}}$$

type of siloxanes are suitable in the production of the defined copolymers and they can be linear, cyclic, or cross-linked in form, so long as they are either liquid themselves or capable of being dissolved in organic solvents such as benzene, toluene, xylene, ethanol, ether, diphenyl ether, etc. R' can be, for example, alkyl such as methyl, ethyl, isopropyl, t-butyl, cyclohexyl and octadecyl; aryl such as phenyl, naphthyl and xenyl; alkenyl such as vinyl, allyl, cyclohexenyl, and octadecenyl; alkaryl such as tolyl, and aralkyl such as benzyl; or halogenated derivatives thereof such as bromophenyl; dichlorophenyl, 1,1,1-trifluoropropyl, chlorovinyl, and α,α,α-trifluorotolyl. The subscript $x$ in the above formula can be an integer of from 0 to 3 inclusive, but should have an average value in the copolymer of at least 0.8.

The conventional siloxanes referred to are well-known materials, and many of such are commercially available. The copolymerization is effected by intimately contacting the new cyclics in liquid phase with any of the defined siloxanes, in the presence of any of the siloxane polymerization catalysts described above and at an appropriate temperature for the particular system. Temperatures from room temperature to about 175° C. are ordinarily suitable. Since the cyclics of this invention are much more reactive than the conventional organosiloxanes, a good technique for copolymerization is to have the mixture of reactants at a suitable reaction temperature for the particular catalyst employed before adding the catalyst. This tends to avoid unwanted homopolymerization of the more reactive constituents.

The preferred copolymers are those containing the previously defined

[—Si(Ph)ₑ(Me)₂₋ₑCH₂CH₂(Ph)ₐ(Me)₂₋ₐSiO—]

units copolymerized with units of the formula $$Vi_vMe_xPh_ySiO_{\frac{4-v-x-y}{2}}$$

where $x$ is an integer from 0 to 3 inclusive, $v$ is an integer of from 0 to 1 inclusive, $y$ is an integer from 0 to 2 inclusive, and the sum of $v+x+y$ has a value of from 0.8 to 3 inclusive in the copolymer, $x$ being 2 only when units are present in which $v+y$ has a positive value. Thus MeSiO₁.₅, Me₃SiO.₅, PhSiO₁.₅, Ph₂SiO, PhMeSiO, Ph₂MeSiO, PhMe₂SiO.₅, ViSiO₁.₅, MeViSiO, PhViSiO, and PhMeViSiO.₅ units can be present alone or in any combination, or any of such units can be present in combination with Me₂SiO units, or with SiO₂ units so long as there are sufficient of the organic groups present to give an average of at least 0.8 R' groups per Si atom.

The proportions of (A) and (B) units in the copolymers can be any amount just short of 100 molar percent of either. Preferably, however, there is at least 1 molar percent of the (A) units present. One particularly preferred type of copolymer contains 1 to 10 molar percent of (A) units with the remainder being Me₂SiO units, or 1 to 10 molar percent (A) units, 85 to 98.99 molar percent Me₂SiO units, and 0.01 to 5 molar percent MeViSiO units.

The copolymers containing conventional organosiloxane units can be in the form of fluids, resins, or gums, depending not only on the previously described factors in regard to the (A) units present, but also upon the relative amount and type of (B) units present. The fluids, resins, and gums are capable of all of the well known uses for which the conventional organosiloxane counterparts have become famous, i.e., damping compounds, potting compounds, rubbery gasketing, molding and laminating resins, protective coatings, and the like.

The following examples are illustrative only. All parts shown are parts by weight.

EXAMPLE 1

A mixture of 483 parts (4.0 moles) CH₂=CHSiMe₂Cl and sufficient of an isopropanol solution of H₂PtCl₆·6H₂O to provide 16×10⁻⁶ mols Pt was heated to 75° C. and agitated while 378 parts Me₂SiHCl was added thereto over a 90 minute period. The heat of reaction maintained the reaction mass at 110° to 120° C. during the reaction. The product was distilled to give almost a quantitative yield of ClMe₂SiCH₂CH₂SiMe₂Cl, boiling at 198° C./734 mm. Hg, freezing point 36.9° C. The latter was warmed to keep it liquid and poured intermittently into an approximately equal weight of cold water, rapid agitation being maintained throughout the addition. After stirring for an additional hour, the hydrolyzate was separated from the resulting aqueous HCl. Toluene was added to the hydrolyzate to facilitate washing, and the resulting solution was washed free of residual acid with aqueous sodium bicarbonate. The removal of solvent from the hydrolyzate by distillation, followed by flushing the material at 120° C. with dry nitrogen, left a relatively anhydrous viscous liquid. A mixture of 137 parts of this liquid and 0.45 part of finely divided KOH was heated, forming a hard polymer at 165° C. which upon further heating in the range of 200 to 250° C. evolved a volatile product. The volatiles were collected and fractionally distilled, giving a 68 percent yield of the compound

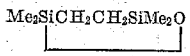

boiling at 125° C./743 mm. Hg, $n_D^{25}$ 1.4142, $d_4^{25}$ 0.855, $R_D$ 0.2922. A higher boiling material was also obtained at 104° to 104.5° C./50 mm. Hg, $n_D^{25}$ 1.4209, $d_4^{25}$ 0.8922, which was thought to be a higher cyclic of similar unit structure.

EXAMPLE 2

By the method of Example 1, $CH_2$=$CHSiPhMeCl$ was reacted with an equimolar amount of $Me_2SiHCl$ in the presence of $H_2PtCl_6 \cdot 6H_2O$. The product was ClMe₂SiCH₂CH₂SiPhMeCl boiling at 191° C./50 mm. Hg. The latter was mixed with 75 percent of its volume of toluene, and the solution added to an approximately equal volume of cold water with rapid agitation. The resulting hydrolyzate was washed free of acid and the toluene removed by distillation, leaving a viscous polymer. To the latter there was added 0.5 percent by weight of finely divided LiOH, and the mixture was heated under reduced pressure. In the range of 225° to 300° C. a volatile liquid was evolved, which upon fractionation was found to be the compound

boiling at 146° C./50 mm. Hg, $n_D^{25}$ 1.4962, $d_4^{25}$ 0.9742.

EXAMPLE 3

When PhMeSiHCl is reacted with $CH_2$=$CHSiPhMeCl$ by the method of Example 2, then the resulting ClPhMeSiCH₂CH₂SiPhMeCl is hydrolyzed and the neutral hydrolyzate heated to 250°–300° C. at a pressure of about 1 mm. Hg in the presence of 0.5 percent LiOH, the compound

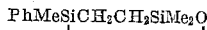

is evolved, B.P. 182° C./10 mm. Hg, $n_D^{25}$ 1.5492, $d_4^{25}$ 1.047.

EXAMPLE 4

The reaction of $Ph_2SiHCl$ and $CH_2$=$CHSiPh_2Cl$ in the presence of $H_2PtCl_6 \cdot 6H_2O$ as in Example 1 produces $ClPh_2SiCH_2CH_2SiPh_2Cl$. When the latter is hydrolyzed and the hydrolyzate heated with LiOH as in Example 2, the product obtained as a distillate under reduced pressure is

The recrystallized product melted at 80 to 81° C., $n_D^{25}$ 1.612.

EXAMPLE 5

The reaction of $(C_6H_{11})MeSiHCl$ with $CH_2$=$CHSiMe_2Cl$ in the presence of $H_2PtCl_6 \cdot 6H_2O$ as in Example 1 produces $ClMe_2SiCH_2CH_2SiMe(C_6H_{11})Cl$. When the latter is hydrolyzed and the hydrolyzate heated with LiOH as in Example 2, the product is the corresponding cyclohexyl substituted compound,

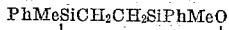

EXAMPLE 6

The reaction of $(C_{12}H_{25})MeSiHCl$ with $CH_2$=$CHSiMe_2Cl$ as in Example 1 produces ClMe₂SiCH₂CH₂SiMe(C₁₂H₂₅)Cl Hydrolysis of the latter and the cracking of the hydrolyzate with LiOH as in Example 2 produces the compound

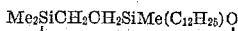

EXAMPLE 7

$Ph_2SiHCl$ was reacted with $CH_2$=$CHSiMe_2Cl$ as in the above examples, to produce the adduct, ClPh₂SiCH₂CH₂SiMe₂Cl boiling at 215° C./10 mm. Hg. The adduct was hydrolyzed and the hydrolyzate was "cracked" with LiOH to produce

B.P. 181° C./11 mm. Hg, $n_D^{25}$ 1.5492, $d_4^{25}$ 1.044.

EXAMPLE 8

$Ph_2SiHCl$ was reacted with $CH_2$=$CHSiPhMeCl$ as above, to produce the adduct $ClPh_2SiCH_2CH_2SiPhMeCl$, boiling at 256° C./8 mm. Hg. The adduct was hydrolyzed and the hydrolyzate was "cracked" with liOH as above to produce the cyclic

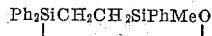

B.P. 241° C./11 mm. Hg, $n_D^{25}$ 1.5860, $d_4^{25}$ 1.092.

EXAMPLE 9

Potassium dimethylsilanolate catalyst was prepared by refluxing 30 parts $(Me_2SiO)_3$, 1 part KOH, and 60 parts toluene for six hours and removing formed water by azeotropic distillation. The catalyst thus formed had the average general formula $KO(Me_2SiO)_{45}K$, and the solution was diluted with further amounts of toluene to provide a final $K_2O$ concentration of $1.085 \times 10^{-3}$ g. per cc. A measured volume of catalyst solution was introduced into each of a series of glass polymerization tubes which had been dried and swept with dry nitrogen, and the toluene was removed from each under reduced pressure. Mixtures containing varying ratios of

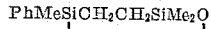

(cyclic C in the table below) mixed with one of the cyclics (D) of Examples 3, 4 or 8 were measured into each tube and the tubes were sealed. The amount of catalyst present provided a concentration of 0.01% $K_2O$ based on the weight of total cyclics present.

The sealed tubes were held at 25° C. for from 15 minutes to 3 hours, then each was opened and Dry Ice was added to deactivate the catalyst by the formation of the carbonate. The time allowed for polymerization was deliberately chosen to provide only about 20 to 30% conversion of the cyclics to copolymers, so that relative reactivity ratios could be studied. The reaction mixtures were dissolved in benzene and the formed copolymers were precipitated by the addition of 95% methanol. The copolymers were separated by centrifugation and further purified by redissolving in benzene and reprecipitating with 95% methanol, followed by devolatilization at 80° C. under reduced pressure for several hours. These copolymers consisted essentially of units (C) of the formula [—SiPhMeCH₂CH₂Me₂SiO—] copolymerized with one type of units (D) having the formula

[—SiPhMeCH₂CH₂PhMeSiO—]
[—SiPh₂CH₂CH₂Ph₂SiO—]

or

[—SiPh₂CH₂CH₂PhMeSiO—]

Analysis proved that the refractive index of any given copolymer of this type varied linearly with the weight percent of one of its consituent polymeric units. Table I below shows the weight of each cyclic introduced into a particular system, the amount of copolymer produced, the refractive index of each copolymer, and the weight percent of (C) units in each copolymer.

Varying amounts of cyclic (C) were also copolymerized with the cyclic trimer (Ph₂SiO)₃, using the above technique except that because of poor compatibility between the two cyclics the copolymerizations were carried out using about an equal weight of tetrahydrofuran as a mutual solvent. The results of this copolymerization are also shown in Table I below. Since the refractive indices of homopolymers of [—SiPh₂CH₂CH₂Ph₂SiO—] or Ph₂SiO units were not determined, the amount of (C) units in copolymers of those units was calculated from analyses of the percent Si.

*Table I*

COPOLYMERIZATION OF PhMeSiCH₂CH₂SiMe₂O (CYCLIC C)

| Cyclic D | Grams C | Grams D | Pct. C in Mix | Wt. Copol. | $n_D^{25}$ | Pct. C in Copol. |
|---|---|---|---|---|---|---|
| PhMeSiCH₂CH₂PhMeSiO | 4.8917 | 0.9888 | 83.19 | 1.6592 | 1.5349 | 69.36 |
|  | 3.9184 | 1.9732 | 66.50 | 1.8544 | 1.5453 | 47.24 |
|  | 2.9066 | 2.8950 | 50.13 | 0.8775 | 1.5528 | 31.27 |
| PhMeSiCH₂CH₂Ph₂SiO | 4.8342 | 0.9770 | 83.18 | 1.1567 | 1.5558 | 57.91 |
|  | 4.8728 | 0.9937 | 83.06 | 1.6612 | 1.5540 | 60.06 |
|  | 2.8718 | 2.8846 | 49.90 | 2.0241 | 1.5824 | 26.22 |
|  | 2.8850 | 2.8945 | 49.94 | 0.9186 | 1.5849 | 23.24 |
|  | 2.6749 | 2.6762 | 49.99 | 1.9322 | 1.5822 | 26.46 |
| Ph₂SiCH₂CH₂Ph₂SiO | 5.5600 | 0.2805 | 95.20 | 1.0615 | 22.68% Si | 77.81 |
|  | 5.3056 | 0.5139 | 91.17 | 1.3671 | 21.45% Si | 67.13 |
|  | 5.1786 | 0.7201 | 87.79 | 1.3929 | 20.20% Si | 56.26 |
| (Ph₂SiO)₃ | 1.8565 | 0.1597 | 92.07 | 0.6621 | 22.81% Si | 87.75 |
|  | 1.8950 | 0.2450 | 88.58 | 0.4401 | 19.55% Si | 79.98 |
|  | 1.7642 | 0.2541 | 87.44 | 1.1902 | 22.61% Si | 85.50 |
|  | 2.0167 | 2.0684 | 49.37 | 0.9911 | 18.57% Si | 39.90 |

Reactivity ratios calculated from the data in Table I show that there is increasing cyclic reactivity with increasing degree of phenyl substitution. Each copolymer in this series was an extremely viscous fluid.

EXAMPLE 10

A series of copolymers was prepared by the general technique of Example 9, except that PhMeSiCH₂CH₂Me₂SiO and the cyclic (Me₂SiO)₃ were used as the reactants and a polymerization temperature of 80° C. was employed. Again the copolymerizations were stopped short of completion so that relative reactivities could be studied. The weight ratios of cyclics used, weight ratios of respective units in the copolymer, refractive index of each copolymer, and percent conversion of cyclics to copolymer are shown in Table II below.

*Table II*

COPOLYMERIZATION OF PhMeSiCH₂CH₂Me₂SiO (CYCLIC C) WITH (Me₂SiO)₃ (CYCLIC D)

| Ratio, C:D | Percent Conversion | $n_D^{25}$ Copol. | Ratio, C:D Units |
|---|---|---|---|
| 10.1/89.9 | 23.4 | 1.4438 | 34.3/65.7 |
| 10.7/89.3 | 15.7 | 1.4536 | 42.6/57.4 |
| 22/78 | 25.6 | 1.4800 | 63.5/34.5 |
| 32.2/67.8 | 34.7 | 1.4918 | 75.7/24.3 |
| 41.7/58.3 | 45.1 | 1.4963 | 80/20 |
| 52.2/47.8 | 48.7 | 1.5053 | 87.5/12.5 |

Reactivity ratios calculated from the data in Table II show that the (C) cyclics are from 100 to 140 times more reactive than the (D) cyclics in this system. Each copolymer was a viscous liquid.

EXAMPLE 11

When CH₂=CHSiPhMeCl is used in place of

CH₂=CHSiMe₂Cl in the process of Example 5, the resulting cyclic product is the compound PhMeSiCH₂CH₂SiMe(C₆H₁₁)O When the latter is contacted with potassium dimethylsilanolate as in Example 9, the corresponding viscous homopolymer is produced. When the cyclic is mixed with (Me₂SiO)₃ and catalyst as in Example 10, the corresponding copolymers are produced.

EXAMPLE 12

When a mixture of 5 mols

PhMeSiCH₂CH₂SiPhMeO 0.33 mol (MeViSiO)₃, and 31.33 mols (Me₂SiO)₃ is heated at 100° C. and sufficient KO(Me₂SiO)K added thereto to provide 1 K/1000 Si atoms, the mixture is converted to a high molecular weight linear copolymeric gum containing

[—SiPhMeCH₂CH₂PhMeSiO—]

MeViSiO, and Me₂SiO units in the approximate molar ratio of 5:1:94 respectively. When this copolymerization is carried out using Ph₂SiCH₂CH₂SiPh₂O as the silethylene cyclic, the comparable copolymer is obtained containing [—SiPh₂CH₂CH₂Ph₂SiO—], MeViSiO and Me₂SiO units. Using (PhViSiO)₃ in place of (MeViSiO)₃ in this process leads to the corresponding gum containing PhViSiO units.

EXAMPLE 13

When a mixture of 5 mols

PhMeSiCH₂CH₂SiPhMeO 31.33 mols (Me₂SiO)₃, and 0.5 mol (PhMe₂Si)₂O is heated at 100° C. and 1 K per 1000 Si atoms is added in the form of KO(Me₂SiO)K, the mixture copolymerizes to form a moderately viscous liquid consisting essentially of [—SiPhMeCH₂CH₂PhMeSiO—], Me₂SiO, and PhMe₂SiO.₅ units in the approximate molar ratio of 5:94:1 respectively. Employing [(Cl₂C₆H₃)Me₂Si]₂O in place of (PhMeSi)₂O in the above mixture leads to the comparable liquid containing 1 mol percent of (Cl₂C₆H₃)Me₂SiO.₅ end-blocking units.

EXAMPLE 14

When a mixture of 5.9 mols

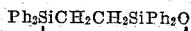
$Ph_2SiCH_2CH_2SiPh_2O$ 31.33 mols $[(F_3CCH_2CH_2)MeSiO]_3$, and 0.033 mol $(MeViSiO)_3$ is heated at 100° C. in the presence of 1 K atom per 10,000 Si atoms in the form of $KO(Me_2SiO)K$, the mixture copolymerizes to form a linear gum consisting essentially of 5.9 mol percent

$[-SiPh_2CH_2CH_2Ph_2SiO-]$ 94 mol percent $(F_3CCH_2CH_2)MeSiO$, and 0.1 mol perment MeViSiO units. This gum can be milled with fillers such as fume silica and vulcanized with peroxides in the conventional manner to produce a fluorinate silicone rubber.

EXAMPLE 15

When 8 mols of a silicone resin containing 60 mol percent $MeSiO_{1.5}$ and 40 mol percent $PhSiO_{1.5}$ units, said resin having about 4 percent by weight uncondensed silicon-bonded OH groups and being in the form of a 50 percent by weight solution in xylene, is mixed with 2 mols

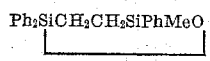
$Ph_2SiCH_2CH_2SiPhMeO$ and the mixture is refluxed in the presence of 0.1% by weight of powdered NaOH, a copolymeric resin is formed which contains about 32 mol percent $PhSiO_{1.5}$, 48 mol percent $MeSiO_{1.5}$, and 20 mol percent

$[-SiPh_2CH_2CH_2PhMeSiO-]$ units.

EXAMPLE 16

A series of homopolymers was prepared by contacting one of the cyclics from Examples 2 to 4, 7, and 8 with potassium dimethylsilanolate in an amount to provide about 0.01% $K_2O$ based on the weight of the cyclic, and heating to 100° to 130° C. for about 20 minutes. The one exception to this general technique was in the case of the tetraphenyl substituted compound (No. 5 below), which was solution polymerized by dissolving it in about 7 times its weight of diphenyl ether. In each case, homopolymers were produced consisting essentially of polymeric units corresponding to the cyclics from which they were derived. The respective polymers are described in Table III below.

Table III
SILETHYLENE HOMOPOLYMERS

| No. | Units | Refractive Index | Physical State |
|---|---|---|---|
| (1) | $-SiPhMeCH_2CH_2Me_2SiO-$ | 1.5199 | Plastic gum. |
| (2) | $-SiPhMeCH_2CH_2PhMeSiO-$ | 1.5675 | Do. |
| (3) | $-SiPh_2CH_2CH_2Me_2SiO-$ | 1.5710 | Do. |
| (4) | $-SiPh_2CH_2CH_2PhMeSiO-$ | 1.6044 | Tough thermoplastic. |
| (5) | $-SiPh_2CH_2CH_2Ph_2SiO-$ | | Insoluble powder. |

Light scattering measurements on homopolymer No. 4 indicated that it had a molecular weight of about 870,000. In No. 5, the polymer precipitated out of the diphenyl ether solution as a powder having a fusion point of about 292° C. This powder was not soluble in any of the common organic solvents.

EXAMPLE 17

When the cyclics employed in Example 16 are heated with sodium- or lithium-dimethylsilanolates, or NaOH, KOH, LiOH, $Me_4NOH$, sulfuric acid, or trifluoroacetic acid in place of the potassium silanolate of that example, comparable homopolymers are obtained.

That which is claimed is:

1. A cyclic organosilicon compound of the formula

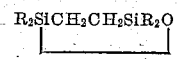
$R_2SiCH_2CH_2SiR_2O$ where R is a radical selected from the group consisting of phenyl, cyclohexyl, and alkyl radicals, at least three of said R radicals being of from 1 to 6 inclusive carbon atoms.

2. The compound of the formula

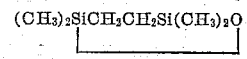
$(CH_3)_2SiCH_2CH_2Si(CH_3)_2O$

3. The compound of the formula

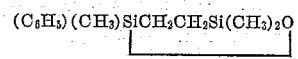
$(C_6H_5)(CH_3)SiCH_2CH_2Si(CH_3)_2O$

4. The compound of the formula

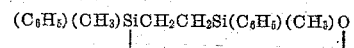
$(C_6H_5)(CH_3)SiCH_2CH_2Si(C_6H_5)(CH_3)O$

5. The compound of the formula

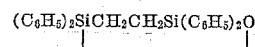
$(C_6H_5)_2SiCH_2CH_2Si(C_6H_5)_2O$

6. The compound of the formula

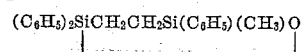
$(C_6H_5)_2SiCH_2CH_2Si(C_6H_5)(CH_3)O$

7. An organosiloxane copolymer consisting essentially of polymeric units (A) of the formula

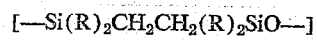
$[-Si(R)_2CH_2CH_2(R)_2SiO-]$ in which R is a radical selected from the group consisting of phenyl, cyclohexyl, and alkyl radicals, at least 3 of said R radicals being of from 1 to 6 inclusive carbon atoms and only one R radical per unit being phenyl, and polymeric units (A) as above defined wherein at least two R radicals per unit are phenyl.

8. An organosiloxane copolymer consisting of essentially of polymeric units of the formula

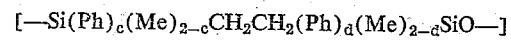
$[-Si(Ph)_c(Me)_{2-c}CH_2CH_2(Ph)_d(Me)_{2-d}SiO-]$ wherein Ph and Me represent phenyl and methyl radicals respectively, c is an integer of from 1 to 2 inclusive, and d is an integer of from 0 to 2 inclusive, and polymeric units of the formula

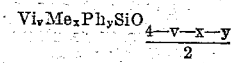
$Vi_vMe_xPh_ySiO_{\frac{4-v-x-y}{2}}$ where Me and Ph are as above defined, Vi is vinyl, x is an integer of from 0 to 3 inclusive, y is an integer of from 0 to 2 inclusive, v is an integer of from 0 to 1 inclusive, and the sum of $v+x+y$ is no greater than 3 and has an average value in the copolymer of at least 0.8, x being 2 only when units are present in which $v+y$ has a positive value.

9. An organosiloxane copolymer consisting essentially of units (A) of the formula

$[-Si(Ph)_c(Me)_{2-c}CH_2CH_2(Ph)_d(Me)_{2-d}SiO-]$ wherein Ph and Me represent phenyl and methyl radicals respectively, c is an integer of from 1 to 2 inclusive, and d is an integer of from 0 to 2 inclusive; units (B) of the formula $(CH_3)_2SiO$; and units (C) of the formula $CH_3(CH_2=CH)SiO$ there being from 1 to 10 inclusive molar percent of the (A) units, from 85 to 98.99 inclusive molar percent of the (B) units, and from 0.01 to 5 inclusive molar percent of the (C) units.

10. An organosiloxane copolymer consisting essentially of units (C) of the formula

$[-SiPhMeCH_2CH_2Me_2SiO-]$ copolymerized with units (D) selected from the group consisting of units of the formulae

[—SiPh$_2$CH$_2$CH$_2$MeSiO—]

[—SiPhMeCH$_2$CH$_2$PhMeSiO—]

[—SiPh$_2$CH$_2$CH$_2$PhMeSiO—]

and

[—SiPh$_2$CH$_2$CH$_2$PhMeSi—]

where Ph and Me represent phenyl and methyl radicals respectively.

11. A process for the preparation of organosiloxane polymers which comprises contacting a cyclic organosilicon compound of the formula $$\overline{R_2SiCH_2CH_2SiR_2O}$$

where R is a radical selected from the group consisting of phenyl, cyclohexyl, and alkyl radicals, at least 3 of said R radicals being of from 1 to 6 inclusive carbon atoms and at least one R radical being phenyl, said cyclic being in a liquid phase, with a catalytic quantity of a siloxane polymerization catalyst.

12. A process for the preparation of organosiloxane polymers which comprises contacting a cyclic organosilicon compound of the formula $$\overline{R_2SiCH_2CH_2SiR_2O}$$

where R is a radical selected from the group consisting of phenyl, cyclohexyl, and alkyl radicals, at least 3 of said R radicals being of from 1 to 6 inclusive carbon atoms and at least one R radical being phenyl, said cyclic being in a liquid phase, with from 0.001 to 2 percent by weight, based on the weight of the cyclic compound, of a siloxane polymerization catalyst selected from the group consisting of NaOH, KOH, LiOH, (CH$_3$)$_4$NOH, concentrated sulfuric acid, trifluoroacetic acid, and siloxane salts of the formulae (CH$_3$)$_3$SiOM and MO[(CH$_3$)$_2$SiO]$_z$M where M represents a metal atom selected from the group consisting of Na, K, and Li, and $z$ is at least one.

13. A process for the preparation of organosiloxane polymers which comprises copolymerizing (A) a cyclic organosilicon compound of the formula $$\overline{R_2SiCH_2CH_2SiR_2O}$$

where R is a radical selected from the group consisting of phenyl, cyclohexyl, and alkyl radicals at least 3 of said R radicals being of from 1 to 6 inclusive carbon atoms and at least one R radical being phenyl, with (B) an organosiloxane of the average general formula $$R'_xSiO_{\frac{4-x}{2}}$$

where R' is selected from the group consisting of monovalent hydrocarbon radicals and halogenated monovalent hydrocarbon radicals, and $x$ is an integer of from 0 to 3 inclusive and has an average value of at least 0.8, by contacting (A) and (B) in a liquid phase in the presence of from 0.001 to 2 percent by weight, based on the total weight of (A) and (B), of a siloxane polymerization catalyst selected from the group consisting of NaOH, KOH, LiOH, (CH$_3$)$_4$NOH, concentrated sulfuric acid, trifluoroacetic acid, and siloxane salts of the formulae (CH$_3$)$_3$SiOM and MO[(CH$_3$)$_2$SiO]$_z$M where M represents a metal atom selected from the group consisting of Na, K, and Li, and $z$ is at least one.

14. A process for the preparation of organosiloxane polymers which comprises a copolymerizing (A) a cyclic organosilicon compound of the formula $$\overline{R_2SiCH_2CH_2SiR_2O}$$

where R is a radical selected from the group consisting of phenyl, cyclohexyl, and alkyl radicals, at least 3 of said R radicals being of from 1 to 6 inclusive carbon atoms, where only one R radical is phenyl, with (B) a cyclic of the aforesaid formula wherein at least two R radicals are phenyl, by contacting (A) and (B) in a liquid phase in the presence of from 0.001 to 2 percent by weight, based on the total weight of the cyclic compounds, of a siloxane polymerization catalyst selected from the group consisting of NaOH, KOH, LiOH, (CH$_3$)$_4$NOH, concentrated sulfuric acid, trifluoroacetic acid, and siloxane salts of the formulae (CH$_3$)$_3$SiOM and MO[(CH$_3$)$_2$SiO]$_z$M where M represents a metal atom selected from the group consisting of Na, K, and Li, and $z$ is at least one.

References Cited in the file of this patent

UNITED STATES PATENTS

| | | |
|---|---|---|
| 2,527,809 | Goodwin | Oct. 31, 1950 |
| 2,561,429 | Sveda | July 24, 1951 |
| 2,562,000 | Sveda | July 24, 1951 |
| 2,592,682 | Goodwin | Apr. 15, 1952 |

UNITED STATES PATENT OFFICE
CERTIFICATE OF CORRECTION

Patent No. 3,041,362                                    June 26, 1962

Robert L. Merker

It is hereby certified that error appears in the above numbered patent requiring correction and that the said Letters Patent should read as corrected below.

Column 5, line 15, for "[-SiPhCH$_2$CH$_2$Me$_2$SiO-]" read -- [-SiPh$_2$CH$_2$CH$_2$Me$_2$SiO-] --; line 43, for "condensation" read -- cocondensation --; column 13, line 3, for "[-SiPh$_2$CH$_2$CH$_2$MeSiO-]" read -- [-SiPh$_2$CH$_2$CH$_2$Me$_2$SiO-] --; line 9, for "[-SiPh$_2$CH$_2$CH$_2$PhMeSi-]" read -- [-SiPh$_2$CH$_2$CH$_2$Ph$_2$SiO-] --.

Signed and sealed this 20th day of November 1962.

(SEAL)
Attest:

ERNEST W. SWIDER
Attesting Officer

DAVID L. LADD
Commissioner of Patents